United States Patent [19]

Conner et al.

[11] Patent Number: 5,623,657

[45] Date of Patent: Apr. 22, 1997

[54] SYSTEM FOR PROCESSING APPLICATION PROGRAMS INCLUDING A LANGUAGE INDEPENDENT CONTEXT MANAGEMENT TECHNIQUE

[75] Inventors: Michael H. Conner; Nurcan Coskun, both of Austin, Tex.

[73] Assignee: International Business Machines Corporation, Armonk, N.Y.

[21] Appl. No.: 396,368

[22] Filed: Feb. 28, 1995

Related U.S. Application Data

[63] Continuation of Ser. No. 176,000, Dec. 30, 1993, abandoned.

[51] Int. Cl.$^6$ ...................................................... G06F 9/44
[52] U.S. Cl. ...................... 395/683; 364/974; 364/282
[58] Field of Search ................................. 395/600, 700, 395/500, 650

[56] References Cited

U.S. PATENT DOCUMENTS

| | | | |
|---|---|---|---|
| 4,525,780 | 6/1985 | Bratt et al. | |
| 4,667,290 | 5/1987 | Goss et al. | 364/200 |
| 4,791,550 | 12/1988 | Stevenson et al. | |
| 4,953,080 | 8/1990 | Dysart et al. | |
| 4,989,132 | 1/1991 | Mellender et al. | |
| 5,161,225 | 11/1992 | Abraham et al. | |
| 5,247,669 | 9/1993 | Abraham et al. | 395/600 |
| 5,261,080 | 11/1993 | Khoyi et al. | 395/500 |
| 5,297,279 | 3/1994 | Bannon et al. | 395/600 |
| 5,303,379 | 4/1994 | Kloyi et al. | 395/700 |

OTHER PUBLICATIONS

Sebesta, "Concepts of Programming Language", 1989, pp. 458–472.
*IBM Technical Disclosure Bulletin*, "Link Class Hierarchy Design," vol. 34, No. 9, Feb. 1992, pp. 166–167.
*IBM Technical Disclosure Bulletin*, "Object–Oriented Programming in C—The Linnaeus System," vol. 32, No. 9B, Feb. 1990.
*IBM Technical Disclosure Bulletin*, "Compatibility of a Granular Privilege Mechanism with Setuid Programs," vol. 34, No. 10A, Mar. 1992, pp. 1–3.

*Primary Examiner*—David Y. Eng
*Attorney, Agent, or Firm*—Jenkens & Gilchrist

[57] ABSTRACT

A data processing system having a language independent context management facility, implements scripting related functions by providing abstract classes. Scripting related objects in a visual builder are: script action objects; script development environments (support object-oriented and procedural scripting languages) and action objects and script debuggers. Abstract classes such as extension language, extension method, and extension activation are used to implement the script-related objects listed above. To support a specific scripting language, a language specific implementation is generated by creating subclasses for the extension language, extension method, and extension activation classes.

12 Claims, 7 Drawing Sheets

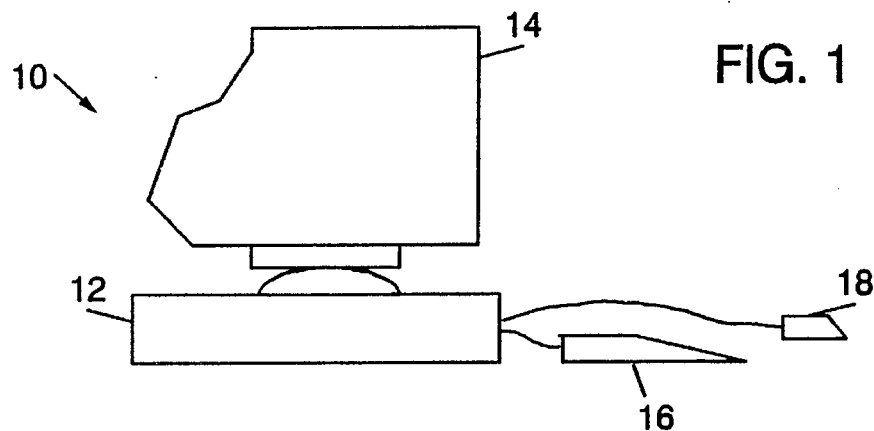
FIG. 1
FIG. 2
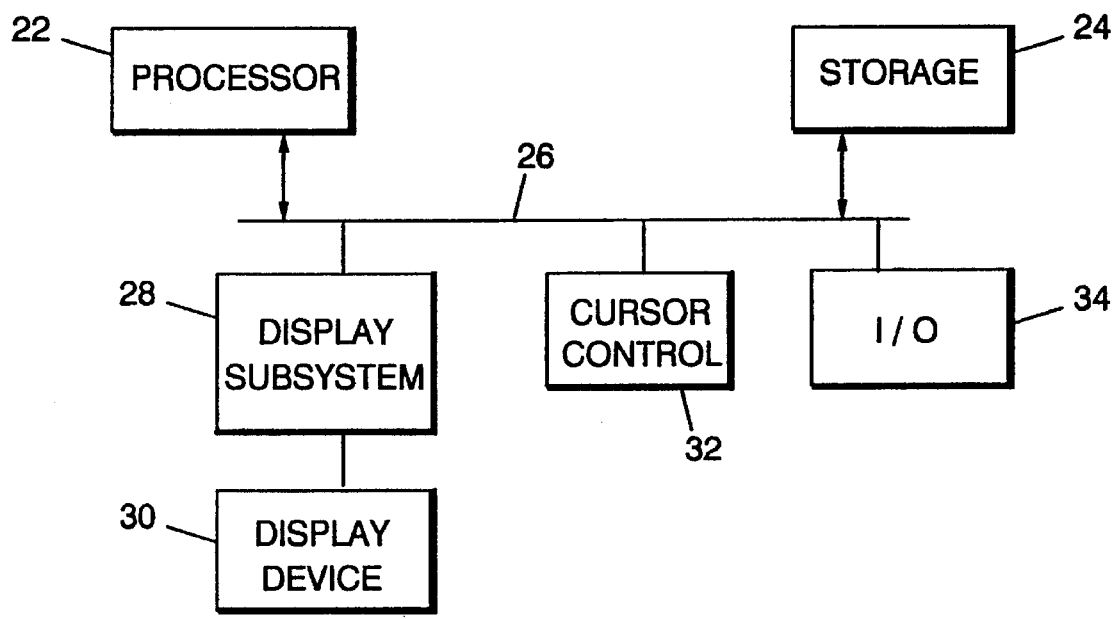
FIG. 3
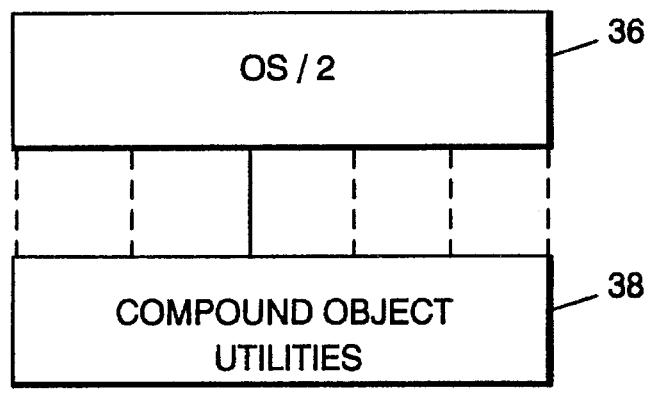

SYSTEM FOR PROCESSING APPLICATION PROGRAMS INCLUDING A LANGUAGE INDEPENDENT CONTEXT MANAGEMENT TECHNIQUE

CROSS REFERENCE TO RELATED APPLICATIONS

This is a continuation of application Ser. No. 08/176,000, filed Dec. 30, 1993 now abandoned.

This application for patent is related to the following applications for patent filed concurrently herewith:

A Computer System for Executing Action Slots including Multiple Action Object Classes, Ser. No. 08/175,999, now abandoned;

A System for Processing an Application Program Including Application Objects, Ser. No. 08/175,465, now abandoned;

Method and System for Efficient Control of the Execution of Actions in an Object Oriented Program, Ser. No. 08/175,873.

BACKGROUND OF THE INVENTION

1. Field of the Invention

The present invention relates to data processing systems, and more particularly to data processing systems having a facility for constructing object oriented programs from objects or macros written in different program languages.

2. Prior Art

Object oriented programming systems provide means for creation and reuse of objects for the purpose of program generation, database management, graphical user interface generation and similar applications. To make most efficient use of object oriented programming, a variety of tools or utilities are required to overcome deficiencies in programming language and operating systems. More particularly, in the design and implementation of application program frameworks, there is a need to create object libraries and to extend well-known programming languages such as the C language to have object oriented capabilities. Further, applications should be designed and implemented so that they may be operating system independent and be able to be run on multiple diverse operating system platforms such as OS/2, AIX, UNIX or Windows. A reference text book which provides a description of Object Oriented Systems, including terminology and structure, is Object-Oriented Analysis and Design with Applications, second edition, by Grady Booch, published by Benjamin/Cummings Publishing Co., Inc. 1993. Reference to this text may be made for definition of terms related to Object-Oriented Systems.

In the prior art, there have been many articles published relating to object oriented programming and several patents which describe implementations of inventions related to object oriented programming where the patents deal primarily with database or file system management in a computer system. An article in Output, Volume 19, No. 1, Pages 15–20, 1990, entitled "Development of Databases—Restricted, Object-Oriented System," by E. M. Mund discusses a flexible dictionary system and a necessary language-independent preprocessor to permit the establishment of a specific development and service environment. This environment permits the application of certain restricted object-oriented techniques, thus allowing the setting up and servicing of data systems to be significantly reduced.

Although the article generally discusses a language independent preprocessor for a data processing system, the article does not teach nor suggest the use of persistent dictionaries in a language independent facility as does the present invention.

U.S. Pat. No. 4,989,132 discloses object-oriented programming language with application and programming objects and management. However, the patent does not teach nor suggest the use of persistent dictionaries in a language independent facility as does the present invention.

U.S. Pat. No. 4,525,780 discloses objects each identified by a code. Application framework is organized as objects. The structure framework has a plurality of different high level user languages. However, the patent does not teach nor suggest the use of persistent dictionaries in a language independent facility as does the present invention.

U.S. Pat. No. 4,953,080 discloses object management with applications and object structures and framework. However, the patent does not teach nor suggest the use of persistent dictionaries in a language independent facility as does the present invention.

An article in the IBM Technical Disclosure Bulletin published March 1992, pages 1–3 discloses object-oriented language support with multilingual capability. However, the article does not teach nor suggest the use of persistent dictionaries in a language independent facility as does the present invention.

A C language reference manual published by Microsoft Corporation, Version 7.0 describes C and C++ language having object-like macros at page 192.

However, the manual does not teach nor suggest the use of persistent dictionaries in a language independent facility as does the present invention.

Graphical user interfaces for compound applications are created by using direct manipulation (drag and drop) and/or menu commands. The control logic of such a user interface can be created by using action objects as described in copending application (Ser. No. 08/175,999). One of the most powerful action objects is the script action object. The state of a script action object includes a macro that is interpreted when the action object is triggered. This macro is often written by using a high level programming language such as Smalltalk, REXX, or LISP. State of the art application builders such as Visual Basic and Digitalk Parts provide a functionality which is similar to a script action object. In Visual Basic, the user is limited to writing scripts in basic. In Digitalk Parts, the user is limited to writing scripts in Smalltalk. This type of restriction limits the market for the visual builder program product. The user population is often divided into groups which prefer to use different languages. For example, in information management systems shops (IMS), most users would prefer using REXX. In research-oriented or education laboratories, most users prefer using LISP. Since there are groups of users for each of these scripting languages, it is desirable to support multiple scripting languages in a single system.

SUMMARY OF THE INVENTION

Accordingly, it is an object of the present invention to provide language independent extension code support in an object-oriented application framework system.

A data processing system having a language independent context management facility, implements scripting related functions by providing abstract classes. Scripting related objects in a visual builder are: script action objects; script development environments (support object-oriented and procedural scripting languages) and action objects and script debuggers. Abstract classes such as extension language, extension method, and extension activation are used to implement the script-related objects listed above.

To support a specific scripting language, a language specific implementation is generated by creating subclasses for the extension language, extension method, and extension activation classes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of a computer system implementing the present invention.

FIG. 2 is a block diagram of elements of the computer system of FIG. 1.

FIG. 3 is a block diagram of the system for controlling the operation of the computer system in accordance with the present invention.

DETAILED DESCRIPTION OF A PREFERRED EMBODIMENT OF THE INVENTION

Figure 4:
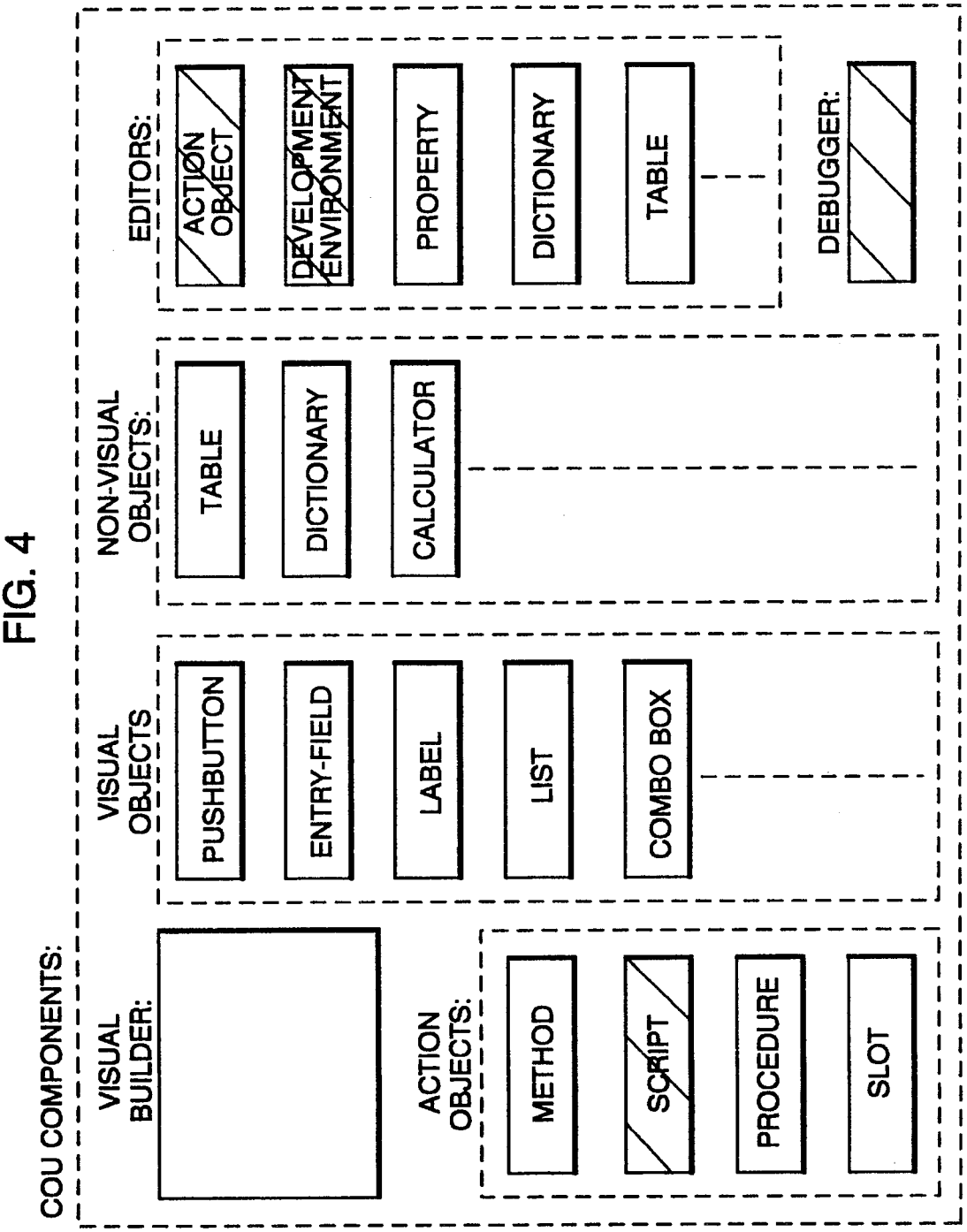
FIG. 4 is a diagram showing the components available in the compound object utilities in accordance with the present invention.

The data processing system embodying the present invention employs compound object technology and provides an application framework for interactive elements of application programs. Application programs are constructed of highly integrated components called application objects. Each application object contains two main parts: the first is the data and the second is the presentation. The data is packaged into an object that is persistent and observable. Persistent means that changes made to the state of the object are preserved from execution to execution. Observable means that changes in the state of the object are visible to other objects. Such data objects are called persistent observable data objects (POD). The presentation pan of an object is called the View object and is also observable. A View object is analogous to the user interface of a traditional application program. There may be several views of the same persistent observable data object. The end users of application objects modify PODs through their Views. A View may be used to present information contained in several persistent observable data objects. The PODs may be grouped into an Inset. An Inset is a collection of PODs with at least one default View for these PODs. The Inset is also a type of POD and is therefore both persistent and observable. In the system according to the present invention, object observability is achieved by the use of action slots and action objects as described in copending application 08/175,999 referred to above in the cross reference to related applications and incorporated by reference herein.

Referring now to FIGS. 1 and 2, a data processing system in accordance with the present invention will be generally described. Data Processing System 10 may be for example a stand-alone graphics workstation having a system unit 12, a color graphics monitor 14, a keyboard 16, and a mouse or other cursor control device 18. Modern graphics workstations are very powerful data processing systems which combine state of the art processing capability with large internal main memories coupled to peripheral storage systems such as magnetic disk drives or optical compact disks to provide the large amount of readily available storage required for graphics applications.

Data Processing System 10 includes processor 22, storage 24, bus 26, display subsystem 28 which drives a display device 30, cursor control logic 32 and input/output channel 34.

Referring now to FIG. 3, the control system will be generally described.

The data processing system described above with reference to FIGS. 1 and 2 may be controlled by a commercially available and well-known multi-tasking operating system such as OS/2* (OS/2 is a registered trademark of International Business Machines Corporation). Among many other tasks which the OS/2 system controls in operating Data Processing System 10, a group of utilities referred to as compound object utilities 38 facilitate the implementation of the use of action objects and action slots in accordance with the present invention. The compound object utilities will be described with reference to FIG. 4.

Referring to FIG. 4, it can be seen that the components of compound object utilities 38 are grouped into several major categories. Among these are a visual builder component (there are many visual builder components available for generating visual objects in object oriented programming systems currently available). Visual object components such as push button, entry field, label, list, and combination box, etc., nonvisual objects such as tables, dictionaries, calculators, etc., editors, such as action objects, layout, properties, dictionaries, and tables, etc., and subclass action objects such as method, script, procedure and slot.

The visual builder is used to create applications visually. Visual builder provides a tool pallet which contains visual and nonvisual objects. The user can use drag/drop operations to create and update application user interfaces visually through a layout editor. Visual builder provides editors to edit or customize different features of an application. For example, property editor is used to change the properties of the objects such as color of a label object or text of a push button object.

The property editor is used to change the properties of objects. The dictionary editor is used to populate a dictionary with integer, real, string and object values. A table editor is used to create a table of numbers. The label editor is used to layout visual objects in compound applications. The second class action object such as method, script, procedure and slot are provided to extend the behavior of visual and nonvisual objects. The action object editor is used to create action objects and add them to the visual or nonvisual objects. Visual objects are used to create the graphical user interface (GUI) for compound applications. Nonvisual objects are used to create the data objects of the compound applications.

The COU components which most specifically relate to the present invention are the script action object, the action object editor, the development environment editor, and the debugger.

Figure 5:
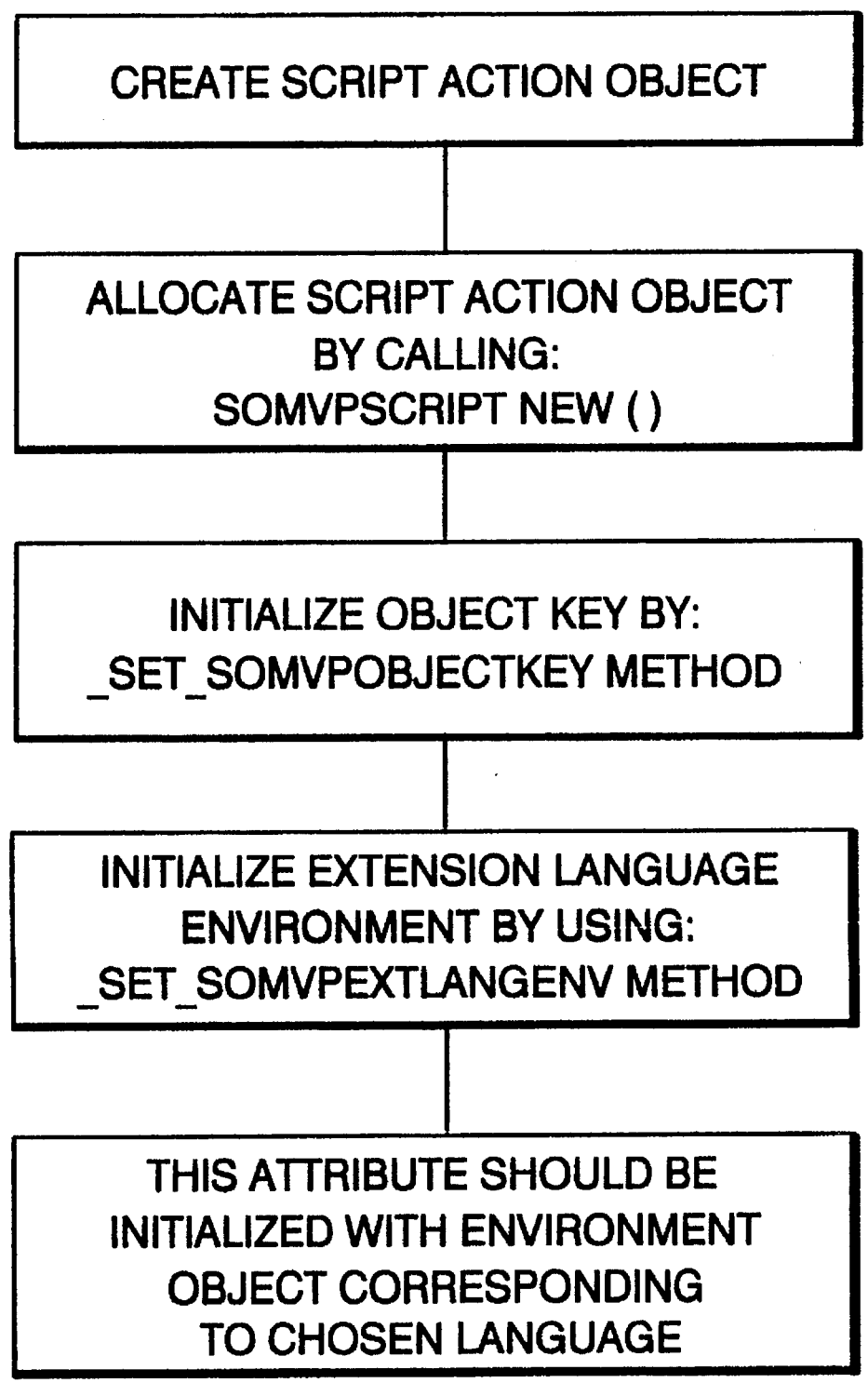
FIG. 5 is a flow diagram showing the creation of a script action object in accordance with the present invention.

Referring now to FIG. 5, the creation of a script action object will be described. A script action object is created and the macro in the script action object is set by the setMacro message. Next, the target object is set by sending the setTargetObject message. The script action object is then added to an action slot on a source object by sending the addActionObject message to the source object; addAction-Object parameters are action slot name and action object.

The script action object is allocated by calling:

somVPScript new().

The object key is then initialized by:

$_{13}$ set__somVPObjectKey method.

Next, the extension language environment is initialized for the language which is chosen (REXX, Digitalk Parts, etc.) by using the following method: $_{13}$ set__somVPExtLangEnv.

Figure 6A:
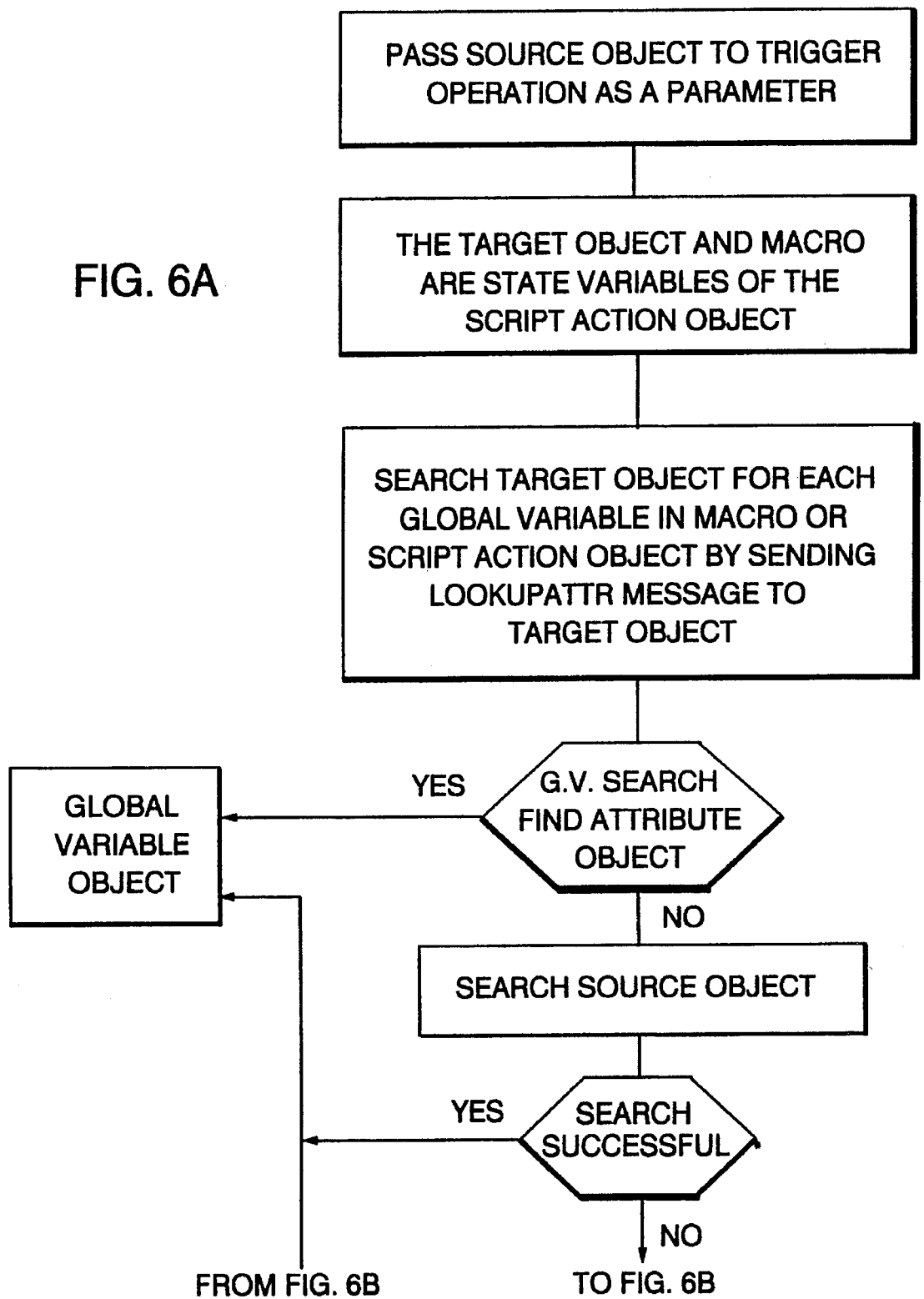
FIG. 6, including 6A and 6B, is a flow diagram showing the triggering of a script action object in accordance with the present invention.
Figure 6B:
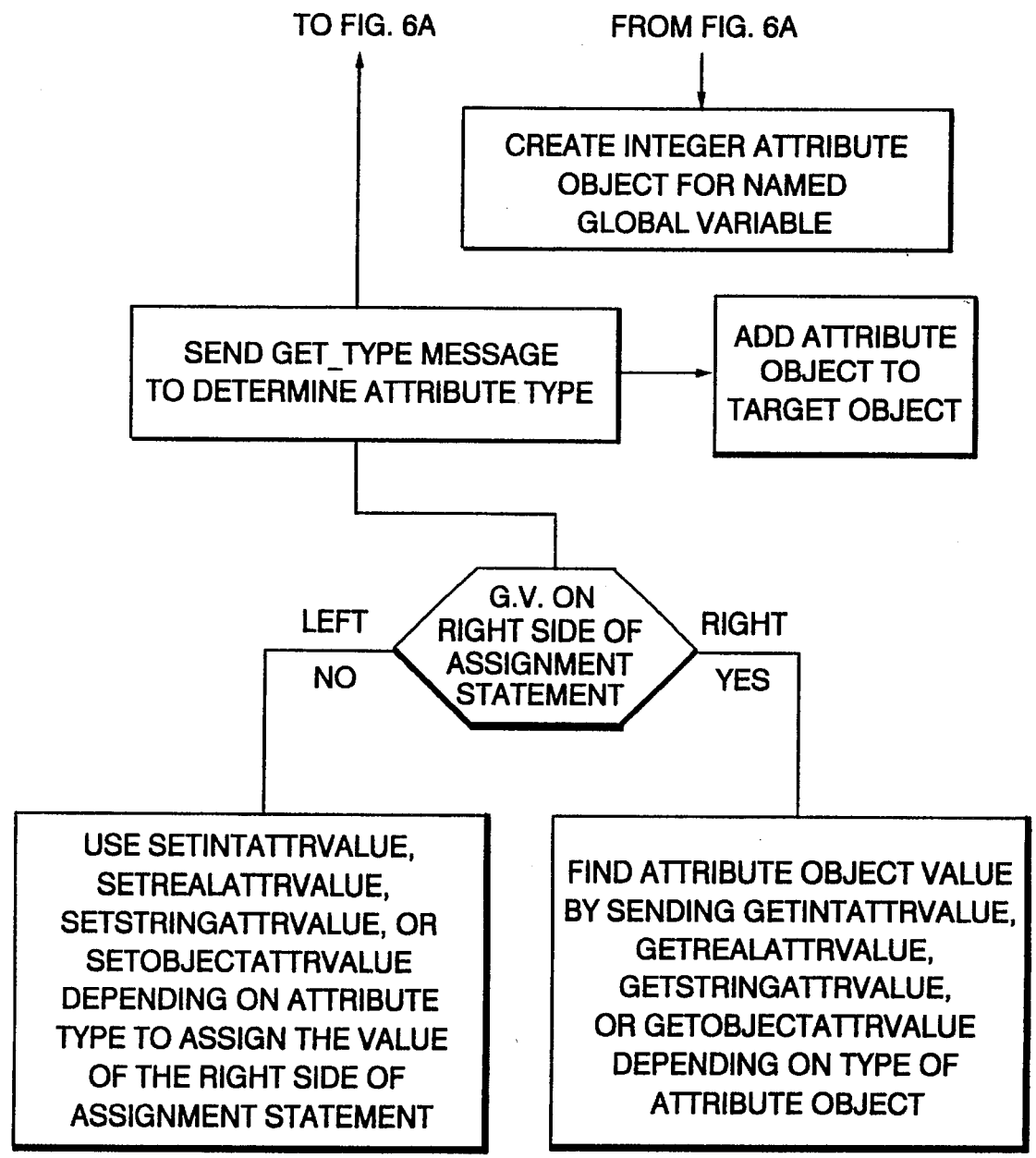

The extension language environment attribute should be initialized with the environment object corresponding to the chosen scripting language. Referring now to FIG. 6, the execution or triggering of a script action object will be described. The source object is passed to the trigger operation as a parameter. The target object and macro are state variables of the script action object. The target object is searched for each global variable in the macro or script action object by sending the lookUpAttr message to the target object. If the search is successful, the attribute object is added to the global variable object. If the search is not successful, a search is made of the source object. Again, if the search is successful, the attribute object is added to the global variable object. If the search of the source object is not successful, and integer attribute object for the named global variable is created and added as an attribute object to the target object. On a successful search, the getType message is sent to determine attribute type. If the global variable is on the right side of the assignment statement, the attribute object value is found by sending either getIntAttrValue; getRealAttrValue; getStringAttrValue; or getObjectAttrValue depending on the type of the attribute object. If the global value is on the left side of the assignment statement, the attribute value is assigned by using one of the following commands depending on the attribute type: setIntAttrValue; setRealAttrValue; setStringAttrValue; setObjectAttValue. An attribute object may be added to the inset as follows: An attribute object is created and a name is set by sending the setName message; next, the value is set by sending the setIntAttrValue message; setRealAttrValue message; setStringAttrValue message; or setObjectAttrValue message. Next, the attribute object is added to the inset by sending the addAttr message (see FIG. 6B). An attribute object may be obtained from the inset by the following:

Send lookUpAttr message to the inset with the attribute name as the input parameter;

Search the inset symbol table to find the named attribute. If it is found, the attribute object is returned otherwise there is a null return.

The type of the attribute object is then found by sending the getAttrType message. The value of the attribute object is then obtained by sending one of the following messages depending on the message type found above: getIntAttrValue message; getRealAttrValue message; getStringAttrValue message; or getObjectAttrValue message.

The inset is essentially a dictionary that holds attribute objects which can hold any value with an integer, real, string or object type. The usage of such a dictionary to represent application objects makes objects extendible.

Thus, objects can be created with an initial state and their initial state can change during execution by changing the values of the existing variables or adding new variables. This type of representation is convenient to customize the default behavior of an application object through action object execution. Insets can be saved or restored as follows:

Save the number of attributes on an external storage medium for each attribute in the dictionary as follows:

Serialize the attribute object by sending the externalized self message. The externalized self message returns the contents of the attribute object as an encoded string. This string representation is saved on the external medium.

To restore the inset, the following steps are taken:

Read the number of attributes from the external medium. Read the string representation of the attribute object. Decode the string and extract the values needed to initialize the attribute object. Create an attribute object and initialize values from the values in the preceding step. Add the attribute object to the inset.

The contents of the inset dictionary can be changed by using dictionary editors directly or using script action objects indirectly. Both extension language environment and dictionary editor environment use the same application programming interfaces to add, get or update the attributes in the inset dictionary.

Also, an attribute action in the inset may be updated by the following:

Get the attribute object from the inset; and set its value by sending one of the following messages: setIntAttrValue, setRealAttrValue, setStringAttrValue, or setObjectAttrValue.

The script action object provided is a general script action object that can be used to interpret an arbitrary scripting language. The interface definition and implementation files are provided in the script.idl and script.c files which follow this description. "SOMVPSCRIPT" class has an attribute called SOMVPEXTLANGENV", and it inherits "SOMVPTARGET" and "SOMVPOBJECTKEY" attributes from its parents.

Figure 7:
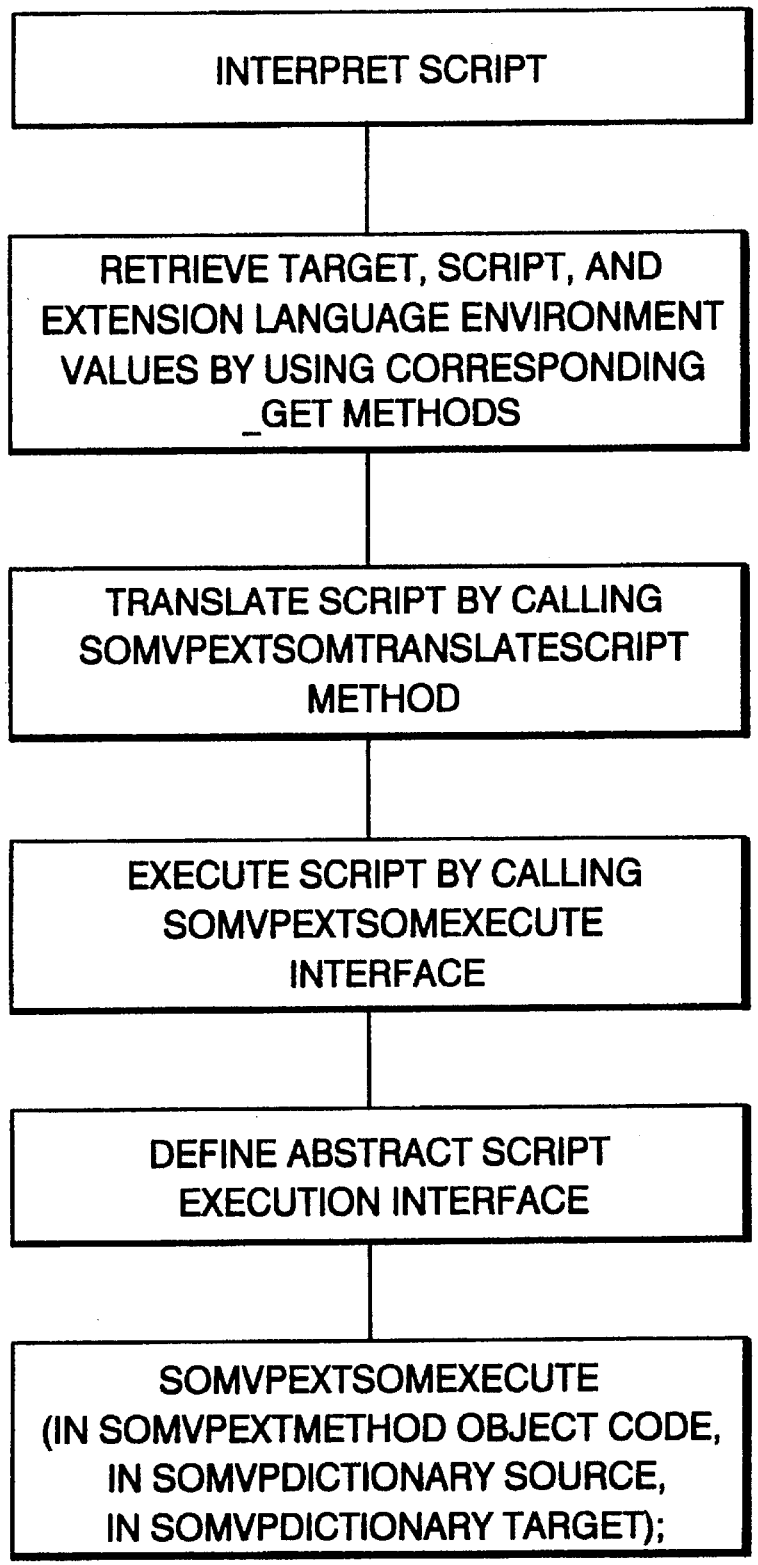
FIG. 7 is a flow diagram showing the process for interpreting the script in the script action object triggered in FIG. 6 in accordance with the present invention.

When a script action object is triggered through the action slot mechanism, the script is interpreted by the following technique (refer now to FIG. 7): The target, script and extension language environment values are retrieved by using appropriate get value messages. Next, the script is translated by calling the "somVPExtsom Translate Script-"method. Next, the script is executed by calling the "som-VPExtsomExecute" interface. The script execution interface is defined as follows:

somVPExtsomExecute (imsomVPextmethode object code, in som VPdictionary source, in somVPdictionary target);

The source and target objects are passed by the action object to the scripting environment. The global variables in the script are searched first in the source dictionary, and if not found, they are searched in the target dictionary. The somVPdictionary class defines access or modification for the global variables.

This type of context management is independent of scripting language environments.

Figure 8:
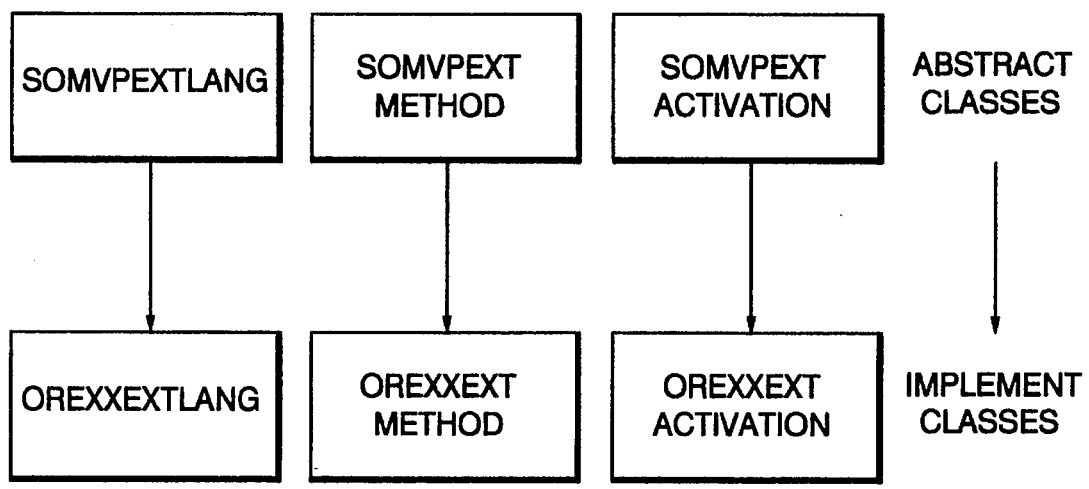
FIG. 8 is a block diagram showing the customization of abstract class objects to subclass implementation objects for a REXX language object.

Refering now to FIG. 8, an example of support for a specific scripting language (REXX) will be shown.

Since the methods defined in somVPExtLang, somVPExtMethod, and somVPExtActivation classes are abstract, they must be overridden to provide a language specific implementation in the subclass. Therefore, the abstract class somVPExtLang is overridden by subclassing a language specific method OREXXExtLang, the abstract class somVPExtMethod is overridden by OREXXExtMethod, and the abstract somVPExtActivation is overridden by the implementation subclass OREXXExtActivation.

The definitions and routines set forth in Appendix A are used to implement a language independent context management technique in accordance with the present invention.

Although the present invention and its advantages have been described in detail, it should be understood that various changes, substitutions and alterations can be made herein without departing from the spirit and scope of the invention as defined by the appended claims.

AT9-93-117                                                              PATENT

APPENDIX A

SCRIPT.C

```
     #define SOMVPScript_Class_Source
     #include <script.ih>
5    #include <callobj.h>
     #include <extlang.h>
     #include <somcdict.h>
     #include <context.h>
     #include <vpdebinc.h>
10   #include <somvpstr.h>
     #include <somvpinc.h>

SOM_Scope integer4  SOMLINK somvpTrigger(SOMVPScript *somSelf,
             Environment *ev,
             void **retValue,
15           SOMObject* source,
             SOMObject* observable,
               char* xap, char* map,
             char debugMode)
     {
20       SOMVPScriptData *somThis = SOMVPScriptGetData(somSelf);
         SOMObject *target;
         char *script;
```

- 15 -

AT9-93-117                                                           PATENT

```
        short rt;
        SOMObject somvpScriptCode;
        SOMVPScriptMethodDebug("SOMVPScript","somvpTrigger");

if(debugMode == SOMVP_TRACE_ACTION)
5           _somvpPrint(somSelf, ev, source, debugMode);

script = __get_somvpObjectKey(somSelf, ev);
        _somvpExtSomTranslateScript(__get_somvpExtLangEnv(somSelf, ev),
                        &somvpScriptCode, script);
        target = __get_somvpTarget (somSelf, ev);

10      /* execute the script */
        rt=(SOMVPDictionary *)_somvpExtSomExecute(
                __get_somvpExtLangEnv(somSelf, ev),
                somvpScriptCode, source, target);

return(rt);
15  }

SOM_Scope string  SOMLINK somvpActionKind(SOMVPScript *somSelf,
    Environment *ev)
    {
        SOMVPScriptData *somThis = SOMVPScriptGetData(somSelf);
20      static char *kind = "script";
        SOMVPScriptMethodDebug("SOMVPScript","somvpActionKind");
```

AT9-93-117                                                              PATENT

```
      return(kind);
    }

SOM_Scope integer4  SOMLINK somvpGetStringForm(SOMVPScript *somSelf,
    Environment *ev,
              string buffer, long bufferLength)
    {
      SOMVPScriptData *somThis = SOMVPScriptGetData(somSelf);
      char *kind;
      SOMVPScriptMethodDebug("SOMVPScript","somvpGetStringForm");

kind = _somvpActionKind(somSelf, ev);
      strcpy(buffer, "(");
      strcat(buffer, kind);
      strcat(buffer, ") ");
      strcat(buffer, " ON ");
      strcat(buffer, __get_somvpObjectKey((__get_somvpTarget (somSelf, ev)), ev));
      return (SOMVP_RETOK);
    }
```

AT9-93-117                                                              PATENT

EXTACTIV.IDL include <somobj.idl>

```
      // An activation object for a script/function/method is
      // created by subclassing the following abstract class.
  5   // Activation object represents information about a
      // specific activation of a SOMVPExtMethod object.
      // For each scripting language, this class needs to be subclassed
      // to create a language specific activation object. All the
      // methods in this class must be overriden in the language
 10   // specific activation object.

interface SOMVPDictionary;
      interface SOMVPExtMethod;

interface SOMVPExtActivation : SOMObject
      {
 15      short somvpExtInterpret(in string script) raises(EXTError::EXT_EXCEPTION);
         // interprets a given extension language script at the
         // current context(context of the activation object)
         // Returns RETOK or RETERR. If it returns RETERR, environment variable
         // needs to be checked for error information.

20      SOMVPExtMethod somvpExtGetMethod();
         // returns the method object for the
```

- 18 -

AT9-93-117                                                          PATENT

```
            // given activation object.

short somvpExtNextClause(out long start, out long end)
                                       raises(EXTError::EXT_EXCEPTION);
            // returns start and end offsets for the next clause.
  5         // (current instruction pointer)
            // It returns RETOK if there is a valid cause
            // that needs to be exceuted.
            // It returns RETERR if there are no more clauses:
            // i.e. end of the script.

10         SOMVPExtActivation somvpExtSender();
            // returns the activation object for the caller.

void somvpExtSetSingleStep(in long mode);
            // single stepping unit is a clause(not a line)
            // sets the single step mode.
 15         // if mode == SINGLE_STEP , sets the single step mode.
            //   does not single steps into the function calls in the
            //   current clause.
            // if mode == SINGLE_STEP_NESTED , sets the nested single step mode.
            //       means single step into the functions if there is
 20         //       function call in the current clause. If there is no
            //       function call, just single step the current clause.
            // if mode == NO_SINGLE_STEP , no single stepping(run until
            //           a break point definition is found)
```

- 19 -

AT9-93-117  PATENT

```
long somvpExtSingleStep();
// returns the single step mode.

SOMVPDictionary somvpExtSOMSymTab();
// returns the symbol table for the current activation.

5      };
```

AT9-93-117                                                              PATENT

EXTMETH.IDL include <somobj.idl>

// "SOMVPExtMethod" class provides interfaces that can be applied
// to the extension language method object. Method object
// represents a translated version of an extension language
// script, function or method.
// Subclass this for each extension language.

interface SOMVPDictionary;
interface SOMVPAttribute;

interface SOMVPExtMethod : SOMObject
{
    short somvpExtExecute(in SOMVPDictionary contextDict,
                    in sequence<SOMVPAttribute> argList)
                            raises (EXTError::EXT_EXCEPTION);
    // Starts the execution of translated object code.
    // Returns RETOK or RETERR. If it returns RETERR, environment variable
    // needs to be checked for error information.

short somvpExtBreakPoint(in long breakpoint,
                    out long start, out long end)
                            raises (EXTError::EXT_EXCEPTION);
    // returns start offset , end offset of a

AT9-93-117                                                    PATENT

```
        // specified break point(breakpoint parameter)
        // Offset is the offset from the beginning of the
        // script(The first character has offset 0, the
        // second character has offset 1, and so on.
5       // returns (RETOK) if the indicated break point exists.
        // returns error(RETERR) if no such break point exists.

long somvpExtBreakPointCount();
        // returns the number of break points.

short somvpExtRemoveBreakPoint(in long offset) raises
10      (EXTError::EXT_EXCEPTION);
        // removes the break points at the given offset.
        // returns (RETOK) if the indicated break point is removed
        // successfully.
        // returns error(RETERR) if no such break point exists.

15      short somvpExtSetBreakPoint(in long offset) raises
        (EXTError::EXT_EXCEPTION);
        // adds a break point at the given offset.
        // returns (RETOK) if the break point is set successfully.
        // returns (RETERR) if the break point can not be set successfully.

20      void somvpExtSetTrace(in long traceopt);
        // sets the trace mode.
        // Different levels of trace mode can be set:
```

- 22 -

AT9-93-117                                                          PATENT

```
//      TRACE_LEVEL_0 : no trace info
//      TRACE_LEVEL_1 : min trace info
//      TRACE_LEVEL_2 : medium trace info
//      TRACE_LEVEL_3 : max trace info
```

5      long somvpExtTrace();
       // returns the trace mode.

string somvpExtSource();
       // returns the source string for the given method object.
       // extension language environment allocates a string buffer
10     // and returns the ownership to the caller.

};

AT9-93-117                                                              PATENT

EXTLANG.IDL include <somobj.idl>

// This class is an abstract class for extension language support.
// Subclass this to support a new extension language.
5   // For each scripting language, this class needs to be subclassed
// to create a language specific interface object. All the
// methods in this class must be overriden in the language
// specific interface object.

interface SOMVPExtMethod;
10  interface SOMVPExtActivation;
interface SOMVPDictionary;

interface SOMVPExtLang : SOMObject
{
    short somvpExtInitialize() raises(EXTError::EXT_EXCEPTION);
15  // Initializes the extension language environment.
    // Passes the extension language environment(self) object
    // that needs to be called when the execution stops.
    // Returns RETOK or RETERR. If it returns RETERR, environment variable
    // needs to be checked for error information.

20  short somvpExtTerminate() raises(EXTError::EXT_EXCEPTION);
    // Terminates the extension language environment.

AT9-93-117                                                          PATENT

```
          // Returns RETOK or RETERR. If it returns RETERR, environment variable
          // needs to be checked for error information.

void somvpExtDebuggerStop(in SOMVPExtActivation activation, in long
          stoptype,
 5                              out boolean completion);
          // The Debuggers stop method.
          // Extension language environment will call this method when
          // it stops the execution of the activation.
          // The execution can be stoppped due to single stepping,
10        // break points, or end of method.
          // "completion" is an ouutput parameter.
          // if "completion" = TRUE, extension language environment will continue
          // the execution as usual.
          // if "completion" = FALSE, extension language environment will continue
15        // stop the execution, clean up the stack.
          // If the execution stops because of the "completion" parameter,
          // "stoptype" will reflect this asomvprdingly(END_OF_EXECUTION).

short somvpExtSomInterpret(in string script,
                    in SOMVPDictionary contextDict) raises(EXTError::EXT_EXCEPTION);
20        // The given script is executed in the given context.
          // Returns RETOK or RETERR. If it returns RETERR, environment variable
          // needs to be checked for error information.

short somvpGetExtObjectVariables(in SOMObject extObject,
```

- 25 -

AT9-93-117                                                          PATENT

```
                inout SOMVPDictionary extVariables)
                raises(EXTError::EXT_EXCEPTION);
        // Get the list of the instance variables for a given object.
        // The returned dictionary has a key for each variable name
5       // and an attribute for the variable value.
        // (includes the parent object instance variables as well
        //  i.e. variables exposed in the methods of the parents)
        // "extVariables" dictionary is an empty dictionary provided
        // to hold class variable definitions.
10      // Returns RETOK or RETERR. If it returns RETERR, environment variable
        // needs to be checked for error information.

short somvpExtGetClassList(out sequence<string> classNameList)
                raises (EXTError::EXT_EXCEPTION);
        // Puts the class names into a string seqence.
15      // Returns RETOK or RETERR. If it returns RETERR, environment variable
        // needs to be checked for error information.

short somvpSubClass(in string extClassName,
                in sequence<string> parentClassNames)
                raises (EXTError::EXT_EXCEPTION);
20      // Create a subclass for a given SOM classes.
        // "parentClassNames" is a sequence of class names for the parents.
        // Returns RETOK or RETERR. If it returns RETERR, environment variable
        // needs to be checked for error information.
```

AT9-93-117                                                      PATENT

```
        short somvpSetParentNames(in string extClassName,
                     in sequence<string> parentClassNames)
                     raises (EXTError::EXT_EXCEPTION);
        // Set the parent class Names.

5       short somvpGetParentNames(in string extClassName,
                     out sequence<string> parentClassNames)
                     raises (EXTError::EXT_EXCEPTION);
        // Get the parent class Names.

short somvpDeleteClass(in string extClassName)
10                   raises (EXTError::EXT_EXCEPTION);
        // Deletes the specified class.

short somvpSetInstanceData(in string extClassName,
              in string extInstanceData) raises (EXTError::EXT_EXCEPTION);
        // Add/Modify the instance data for the extension language class.
15      // Returns RETOK or RETERR. If it returns RETERR, environment variable
        // needs to be checked for error information.

short somvpGetInstanceData(in string extClassName,
              out string extInstanceData) raises (EXTError::EXT_EXCEPTION);
        // Get the instance data for the extension language class.

20      short somvpAddExtMethod(in string extClassName,
                     in string extMethodName,
```

- 27 -

AT9-93-117                                                              PATENT

```
                    in string extMethodBody)
                            raises (EXTError::EXT_EXCEPTION);
        // Add/Override a method in extension language.
        // Returns RETOK or RETERR. If it returns RETERR, environment variable
 5      // needs to be checked for error information.

short somvpGetExtMethods(in string extClassName,
                inout SOMVPDictionary extMethods)
                            raises (EXTError::EXT_EXCEPTION);
        // Get the list of the methods for a given class.
10      // The returned dictionary will have a number of string
        // attributes. The name of the string attribute is the name of the
        // method, its value is method body.
        // The methods that are returned belong to the immediate class.
        // Need to query the parent class object to find out the parent methods.
15      // "extMethods dictionary" is an empty dictionary provided
        // to hold method definitions.
        // Returns RETOK or RETERR. If it returns RETERR, environment variable
        // needs to be checked for error information.

short somvpGetExtMethod(in string extClassName,
20                      in string extMethodName,
                        out string extMethodBody)
                            raises (EXTError::EXT_EXCEPTION);
        // Get the method body for a given method and class.
        // Extension language environment allocates a buffer, "extMethodBody",
```

- 28 -

```
        // and initializes with the method body.
        // Returns RETOK or RETERR. If it returns RETERR, environment variable
        // needs to be checked for error information.

short somvpDeleteExtMethod(in string extClassName,
                in string extMethodName) raises (EXTError::EXT_EXCEPTION);
        // Delete the method from the class.
        // Returns RETOK or RETERR. If it returns RETERR, environment variable
        // needs to be checked for error information.

short somvpExtGetMethodCode(in string className,
                        in string methodName,
                        out SOMVPExtMethod objectCode)
                        raises (EXTError::EXT_EXCEPTION);
        // Returns the object code for a method.
        // Returns RETOK or RETERR. If it returns RETERR, environment variable
        // needs to be checked for error information.

short  somvpGetExtClassVariables(in string extClassName,
                inout SOMVPDictionary extVariables)
                        raises (EXTError::EXT_EXCEPTION);
        // Get the list of all the possible variables for a given class.
        // The returned dictionary has a key for each variable name,
        // and type information.
        // "extVariables" dictionary is an empty dictionary provided
        // to hold class variable definitions.
```

AT9-93-117                                                              PATENT

```
        // Returns RETOK or RETERR. If it returns RETERR, environment variable
        // needs to be checked for error information.

short somvpExtSomTranslateScript(out SOMVPExtMethod objectCode,
                in string scriptBody) raises (EXTError::EXT_EXCEPTION);
5       // Translates a script.
        // Extension language environment returns a method object(SOMVPExtMethod)
        // for the translated script.
        // Returns RETOK or RETERR. If it returns RETERR, environment variable
        // needs to be checked for error information.

10      short somvpExtSomExecute(in SOMVPExtMethod objectCode,
                in SOMVPDictionary source,
                in SOMVPDictionary target) raises (EXTError::EXT_EXCEPTION);
        // Starts the execution of translated object code.
        // Global variables in the script will be searched in the source
15      // dictionary first, then in the target dictionary.
        // Returns RETOK or RETERR. If it returns RETERR, environment variable
        // needs to be checked for error information.

short somvpExtSomExecuteFunction(in string functionName,
                in SOMVPDictionary source,
20              in SOMVPDictionary target) raises (EXTError::EXT_EXCEPTION);
        // Starts the execution of a function.
        // Global variables in the script will be searched in the source
        // dictionary first, then in the target dictionary.
```

AT9-93-117                                                              PATENT

```
              // Returns RETOK or RETERR. If it returns RETERR, environment variable
              // needs to be checked for error information.

short somvpExtGetFunctionDict(inout SOMVPDictionary funcDict)
                             raises (EXTError::EXT_EXCEPTION);
 5            // Initializes "funcdict" with the function definitions.
              // The dict has the <name, value> pairs. "name" is the name of
              // the function, "value" is a string value(function definition body).
              // "funcdict" dictionary is an empty dictionary provided
              // to hold function definitions.
10            // Returns RETOK or RETERR. If it returns RETERR, environment variable
              // needs to be checked for error information.

short somvpExtAddFunction(in string functionName,
                        in string functionBody)
                             raises (EXTError::EXT_EXCEPTION);
15            // Adds/Modifies a named function.
              // Returns RETOK or RETERR. If it returns RETERR, environment variable
              // needs to be checked for error information.

short somvpExtGetFunction(in string functionName,
                        out string functionBody)
20                           raises (EXTError::EXT_EXCEPTION);
              // Returns the function body for the named function.
              // Extension language environment allocates "functionBody"
              // buffer and initializes with the function definition.
```

AT9-93-117                                                              PATENT

```
           // Returns RETOK or RETERR. If it returns RETERR, environment variable
           // needs to be checked for error information.

short somvpExtDeleteFunction(in string functionName)
                        raises (EXTError::EXT_EXCEPTION);
  5        // Delete the named function.
           // Returns RETOK or RETERR. If it returns RETERR, environment variable
           // needs to be checked for error information.

short somvpExtGetFunctionCode(in string functionName,
                   out SOMVPExtMethod objectCode) raises
 10        (EXTError::EXT_EXCEPTION);
           // Returns the object code for a function.
           // "objectCode" is needed to set up the break points in the functions, etc.
           // If the user has a valid method object, which may correspond
           // to a function, or script, the user can then use a
 15        // "somvpExtSomExecute" interface to invoke it.
           // Returns RETOK or RETERR. If it returns RETERR, environment variable
           // needs to be checked for error information.

short somvpExtReadFile(in string fileName,
                   out sequence<string> packageItemName,
 20             out sequence<long> packageItemKind) raises
           (EXTError::EXT_EXCEPTION);
           // Reads the file, and returns the list of the package items.
           // A package could have a mixture of class definitions and
```

- 32 -

AT9-93-117  PATENT

```
         // function definitions.
         // "packageItemName" is a string sequence allocated by the
         // extension language environment and each item in the sequence
         // contains the name of a function/class.
    5    // "packageItemKind" is an integer sequence allocated by
         // extension language environment and each item in the sequence is equal
         // to FUNCTION_DEF or CLASS_DEF.
         // Returns RETOK or RETERR. If it returns RETERR, environment variable
         // needs to be checked for error information.

10    short somvpExtGetPackage(in sequence<string> packageItemName,
                         in sequence<long> packageItemKind,
                         out string package) raises (EXTError::EXT_EXCEPTION);
         // Returns a package for the named class and function definitions.
         // "package" is a null terminated string.
   15    // Returns RETOK or RETERR. If it returns RETERR, environment variable
         // needs to be checked for error information.

};
```

AT9-93-117                                              PATENT

SCRIPT.IDL

```
#include <actions.idl>

// This class is used to create a script action object.
// Source and target objects are two parameters passed to the
// script as the last two parameters implicitly.

interface SOMVPExtLang;

interface SOMVPScript : SOMVPActions
{ attribute SOMVPExtLang somvpExtLangEnv;
ifdef __SOMIDL__
    implementation {
      somvpTrigger: override;
      somvpActionKind: override;
      somvpGetStringForm: override;
    };
#endif /* __SOMIDL__ */
};
```

What is claimed is:

1. An information handling system for executing application programs having one or more objects, comprising:

a processor for executing one or more application programs under the control of an operating system;

a memory, associated with said processor, for storing said operating system, said application programs, and said objects;

a display subsystem for providing a user interface and for displaying representations of said objects;

a cursor control device for selecting and triggering one or more of said objects;

said objects comprising action objects wherein each said action object includes one or more scripts, each such script being written in one of a plurality of languages, each of said plurality of languages having an extension language attribute;

means for initializing an extension language attribute for each of said plurality of languages used in an action object script; and means for interpreting said action object scripts independent of a language in which said scripts are written.

2. A system, according to claim 1, wherein one or more of said action objects are script action objects.

3. A system, according to claim 2, further comprising:

means for creating a script action object.

4. A method for executing application programs having one or more objects, comprising:

executing one or more application programs, in a processor, under the control of an operating system;

storing, in a memory, said operating system, said application programs, and said objects;

displaying, on a display device, representations of said objects;

selecting one or more of said objects employing a cursor control device;

creating one or more action objects from said selected objects;

initializing an extension language attribute for each of a plurality of languages used in an action object; and interpreting said action object scripts in accordance with a language associated with said extension language attribute.

5. A method, according to claim 4, further comprising the steps of:

saving a state of a persistence class on termination of processing said application program; and restoring the saved state of said persistence class on a subsequent initiation of processing of said application program.

6. A method, according to claim 4, further comprising the step of:

creating a subclass action object.

7. A method, according to claim 4, further comprising the step of:

interpreting said action objects independent of any of said program languages.

8. A method, according to claim 7, wherein said step of interpreting further comprises the steps of:

retrieving script object and extension language environment values;

translating data in said script object; and executing said script object.

9. A method, according to claim 8, wherein said step of interpreting further comprises the steps of:

defining an script execution interface; and executing said script execution interface in association with one or more persistent objects.

10. A method, according to claim 4, wherein said initializing step further comprises the step of:

establishing an implementation subclass for extension language, extension method and extension activation for a selected program language.

11. A method for executing a language independent action object, comprising the steps of:

passing a source object as a parameter to a trigger operation;

searching a target object for one or more global variables;

adding each global variable found by said searching step to a global variable object;

creating an integer attribute object for a global variable, if no global variable is found by said searching step;

adding said integer attribute object to said target as an attribute object;

determining attribute type, for said attribute object, if said searching step finds one or more global variables;

determining a value for said attribute object; and adding an attribute object to an inset.

12. A method according to claim 11, wherein said step of adding an attribute object to an inset comprises the steps of:

storing said attribute object in an extendible dictionary of attribute objects.

* * * * *

UNITED STATES PATENT AND TRADEMARK OFFICE
CERTIFICATE OF CORRECTION

PATENT NO. : 5,623,657
DATED : April 22, 1997
INVENTOR(S) : Conner et al.

It is certified that error appears in the above-indentified patent and that said Letters Patent is hereby corrected as shown below:

Column 5, Line 27      Delete "$_{13}$ set_somVPObjectKey"
                           Insert --_set_somVPObjectKey--

Column 5, Lines 30-31  Delete "$_{13}$ set_somVPExtLangEnv"
                           Insert --_set_somVPExtLangEnv--

Signed and Sealed this

Twenty-fourth Day of June, 1997

Attest:

BRUCE LEHMAN

Attesting Officer      Commissioner of Patents and Trademarks